United States Patent [19]

Ferri et al.

[11] 3,948,798

[45] Apr. 6, 1976

[54] TITANIUM-ACTIVATED LANTHANUM OXYSULFIDE PHOSPHOR AND METHOD OF PREPARING SAME

[75] Inventors: John L. Ferri, Towanda; James E. Mathers, Ulster, both of Pa.

[73] Assignee: GTE Sylvania Incorporated, Stamford, Conn.

[22] Filed: Dec. 23, 1974

[21] Appl. No.: 535,492

[52] U.S. Cl. ................. 252/301.4 S; 252/301.4 F
[51] Int. Cl.[2] ................ C09K 11/46; C09K 11/14
[58] Field of Search . 252/301.4 S, 301.4 F, 301.4 R

[56] References Cited
UNITED STATES PATENTS 3,418,246  12/1968  Royce ........................ 252/301.4 S
3,502,590  3/1970  Royce et al. ................ 252/301.4 S

*Primary Examiner*—Jack Cooper
*Attorney, Agent, or Firm*—Norman J. O'Malley; Donald R. Castle; William H. McNeill

[57] ABSTRACT

An orange broad-band emitting phosphor is a titanium-activated lanthanum oxysulfide containing up to about 0.05 moles of titanium per mole of lanthanum oxysulfide host. The phosphor is prepared by incorporating titanium oxide in the desired ratio to lanthanum into the mixture at the time the lanthanum is sulfurized in the presence of an alkali metal carbonate, to form lanthanum oxysulfide.

8 Claims, No Drawings

TITANIUM-ACTIVATED LANTHANUM OXYSULFIDE PHOSPHOR AND METHOD OF PREPARING SAME

BACKGROUND OF THE INVENTION

1. Field of the Invention

This invention relates to luminescent compositions. More particularly it relates to a titanium-activated lanthanum oxysulfide and to a process for preparing same.

2. Prior Art

Phosphors having a lanthanum oxysulfide host are known. Rare earth activators have in the past been used to activate the lanthanum oxysulfide host. For example, U.S. Pat. No. 2,462,547 discloses europium and samarium as activators for lanthanum oxysulfide to form a phosphor for emitting light when excited by ultraviolet light. U.S. Pat. No. 3,418,247 indicates that dysprosium, erbium, europium, holmium, neodymium, praseodymium, samarium, terbium, or thulium can be used as activators for lanthanum oxysulfide to form a cathodoluminescent phosphor. U.S. Pat. No. 3,725,704 indicates that a terbium-activated lanthanum oxysulfide is an efficient x-ray phosphor. All of the foregoing art indicates that rare-earths are useful as activators for lanthanum oxysulfide. No art has been found that indicates that non-rare earth metals are useful as activators. Since many non-rare earth metals are more common than rare earths, it is believed a phosphor composition which employs titanium as an activator offers an attractive alternate activator and is thus an advancement in the art.

OBJECTS AND SUMMARY OF THE INVENTION

It is an object of this invention to provide a new luminescent material.

It is a further object of this invention to provide a non-rare earth activated lanthanum oxysulfide.

It is another object of this invention to provide a new luminescent material, titanium-activated lanthanum oxysulfide.

It is an additional object of this invention to provide a process for preparing a titanium-activated lanthanum oxysulfide.

These as well as other objects are achieved in one aspect of this invention comprising a luminescent composition consisting essentially of a host of lanthanum oxysulfide and from about 0.0001 moles to about 0.05 moles of titanium per mole of host to serve as an activator.

In another aspect of this invention there is provided a process for preparing titanium-activated lanthanum oxysulfide comprising forming a relative uniform admixture of a lanthanum oxide source, an alkali metal carbonate, a reactive titanium source and sulfur in specific ratios, wherein the sulfur is in an excess of the amount theoretically required to convert lanthanum oxide to lanthanum oxysulfide and the amount of titanium oxide is no greater than 0.05 moles per mole of lanthanum oxide, and the alkali metal carbonate is about 15 weight percent of the admixture heating the admixture in a non-oxidizing atmosphere at a temperature of at least about 1200°C for a time sufficient to convert said lanthanum oxide to lanthanum oxysulfide, washing the fired mixture with sufficient water to remove any residual water soluble material and drying the resulting phosphor.

DETAILS OF THE PREFERRED EMBODIMENTS

For a better understanding of the present invention, together with other and further objects, advantages, and capabilities thereof, reference is made to the following disclosure and appended claims in connection with the above description of some of the aspects of the invention.

The titanium-activated lanthanum oxysulfide phosphors of this invention have been found to emit a broad band orange emission when excited by high-energy photons such as x-rays or low-energy photons such as long and short wave ultraviolet light. It therefore can be used in a variety of lamps to give the desired emission of white or yellow light. At the present time x-ray film is more sensitive to blue emission, however, since the emission is broad band the phosphor can be used as an x-ray phosphor.

The effective amount of titanium activator is from about 0.0001 moles to about 0.05 moles of actuator per mole of lanthanum oxysulfide host. Less than about 0.0001 moles does not yield an efficient phosphor but some emission can occur. More than about 0.05 moles of titanium per mole of host tends to result in a non-luminescent material. Thus in the admixture used to form the phosphor the ratio or titanium to lanthanum is no greater than 0.05 moles of titanium per mole of lanthanum calculated as $La_2O_2S$.

The method of incorporating the titanium activator into the $La_2O_2S$ lattice is accomplished by having a reactive titanium source such as titanium dioxide present at the time the lanthanum carbonate is converted to lanthanum oxysulfide by sulfuring the raw materials at elevated temperature in a non-oxidizing atmosphere.

The lanthanum sources are lanthanum oxide or lanthanum carbonate. The presence of an alkali metal carbonate as a flux is necessary. The flux, since carbon dioxide is evolved, performs a variety of functions whereby the particle size is controlled, and aids in the incorporation of the activator into the matrix as well as preventing the formation of lanthanum polysulfide materials. Since alkali metal sulfides and alkali metal carbonates are water soluble and lanthanum oxysulfide is water insoluble, the removal of the excess material and by-products is easily accomplished by water washing. At least about 15% by weight of the admixture to be sulfurized is alkali metal carbonate and greater than 15 weight percent in excess and is generally from about 2 to 6 times that stoichiometrically required. Greater than 15% by weight of the flux can be used, however, amounts in excess of about 25% serve no additional purpose and add excessive costs to the process.

After the admixture is formed the admixture is heated in a non-oxidizing atmosphere to a temperature of at least 1200°C for a time sufficient to convert the lanthanum source to lanthanum oxysulfide. Thereafter the fired material is washed to remove any residual water soluble material and is then dried. Temperatures as high as about 1400°C can be used, however, about 1,225° to about 1,250°C is preferred. In most instances a firing time of from about 2 to about 6 hours is sufficient.

To more fully illustrate the invention the following detailed examples are given. All parts, proportions, and percentages are by weight unless otherwise indicated.

EXAMPLE 1

About 112 parts of sulfur, about 127 parts of sodium carbonate, about 326 parts of lanthanum oxide and about 2.4 parts of titanium oxide are blended to form a relatively uniform admixture.

The mixture is heated for about 3 hours in a non-oxidizing atmosphere at about 1,230 °C. The fired material is washed with sufficient water to remove any water soluble residual material. The resulting material after being dried emits a broad band yellow emission when excited by ultraviolet light at 2537 nanometers.

Substantially similar results are achieved when the quantity of titanium dioxide is decreased to 0.8 parts and 0.4 parts.

The preferred level is from about 0.005 to about 0.015 moles per mole of host.

While there has been shown and described what are at present considered the preferred embodiment of the invention, it will be obvious to those skilled in the art that various changes and modifications may be made therein without departing from the scope of the invention as defined by the appended claims.

What is claimed is:

1. A luminescent composition consisting essentially of a lanthanum oxysulfide host and from about 0.0001 moles to about 0.05 moles of titanium per mole of host as an activator.

2. A composition according to claim 1 wherein said activator is present in amounts of from about 0.005 moles to about 0.015 moles per mole of host.

3. A process for producing a titanium-activated lanthanum oxysulfide comprising:

forming a relatively uniform admixture of a lanthanum source selected from the group consisting of lanthanum oxide and lanthanum carbonate, titanium dioxide, sulfur and an alkali metal carbonate as a flux, said sulfur being greater than 15 weight percent in excess of the stoichiometrical amount required to form lanthanum oxysulfide, said alkali metal carbonate is from about 15 to 25 weight percent of the admixture and the amount of titanium dioxide being from about 0.0001 moles to about 0.05 moles per mole of lanthanum source, b. heating said admixture in a non-oxidizing atmosphere at a temperature of at least 1,200°C for a time sufficient to form lanthanum oxysulfide, c. washing the resulting mixture with sufficient water to remove any water soluble material, and d. drying the washed oxysulfide.

4. A process according to claim 3 wherein said flux is sodium carbonate.

5. A process according to claim 3 wherein said lanthanum source is lanthanum oxide.

6. A process according to claim 3 wherein said lanthanum source is lanthanum carbonate.

7. A process according to claim 3 wherein the amount of sulfur is from about 2 to about 6 times said stoichiometrical amount.

8. A process according to claim 3 wherein said titanium dioxide is from about 0.005 to about 0.015 moles per mole of lanthanum source.

\* \* \* \* \*